United States Patent
Halasz et al.

(10) Patent No.: US 8,132,177 B2
(45) Date of Patent: Mar. 6, 2012

(54) SYSTEM AND METHOD FOR LOAD-BALANCING IN SERVER FARMS

(75) Inventors: Sylvia Halasz, Fair Haven, NJ (US); Kamlesh Tewani, Freehold, NJ (US)

(73) Assignee: AT & T Intellectual Property II, LP, Atlanta, GA (US)

( * ) Notice: Subject to any disclaimer, the term of this patent is extended or adjusted under 35 U.S.C. 154(b) by 1112 days.

(21) Appl. No.: 11/958,860

(22) Filed: Dec. 18, 2007

(65) Prior Publication Data

US 2009/0158290 A1  Jun. 18, 2009

(51) Int. Cl.
G06F 9/46 (2006.01)
G06F 15/173 (2006.01)
(52) U.S. Cl. .................. 718/105; 709/226
(58) Field of Classification Search .......... 718/105; 709/226
See application file for complete search history.

(56) References Cited

U.S. PATENT DOCUMENTS

| | | | |
|---|---|---|---|
| 6,922,724 B1 | 7/2005 | Freeman et al. | |
| 6,996,615 B1 * | 2/2006 | McGuire | 718/105 |
| 7,032,037 B2 | 4/2006 | Garnett et al. | |
| 7,047,301 B2 * | 5/2006 | Skene et al. | 709/226 |
| 7,062,570 B2 | 6/2006 | Hong et al. | |
| 7,197,547 B1 | 3/2007 | Miller et al. | |
| 7,509,461 B1 * | 3/2009 | Bhayana et al. | 711/144 |
| 7,860,918 B1 * | 12/2010 | Baldonado et al. | 709/201 |
| 2002/0087694 A1 * | 7/2002 | Daoud et al. | 709/226 |

* cited by examiner

Primary Examiner — Li Zhen
Assistant Examiner — Bradford Wheaton
(74) Attorney, Agent, or Firm — Fay Kaplun & Marcin, LLP.

(57) ABSTRACT

A system and method for receiving a server request, determining whether one of a plurality of servers scheduled to receive the server request is available, wherein the availability of the one of the servers scheduled to receive the request is based on a first stored value and a second stored value, incrementing the second stored value by a predetermined amount when the one of the servers is unavailable and directing the server request to another one of the plurality of servers based on the first and second stored values.

13 Claims, 5 Drawing Sheets

SYSTEM AND METHOD FOR LOAD-BALANCING IN SERVER FARMS

BACKGROUND

Electronic commerce, or "e-commerce," is increasingly prevalent in today's marketplace. Through the use of the Internet, buyers and sellers can securely accomplish transactions regardless of their geographic proximity, and buyers can find sellers of goods that they might not otherwise have access to.

The ever-increasing use of the Internet for both communications and commerce carries with it a constant increase in network traffic and complexity. Companies that do large amounts of business online typically use systems incorporating multiple servers (sometimes referred to as "server farms") to handle large amounts of traffic.

As a result of increasing amounts of traffic traversing through increasingly complicated computer networks, the efficient routing of network traffic is critical to make the user experience pleasant, insure that secure information (e.g., credit card numbers) remains secure, and provide assurance that communications are not lost.

SUMMARY OF THE INVENTION

A method for receiving a server request, determining whether one of a plurality of servers scheduled to receive the server request is available, wherein the availability of the one of the servers scheduled to receive the request is based on a first stored value and a second stored value, incrementing the second stored value by a predetermined amount when the one of the servers is unavailable and directing the server request to another one of the plurality of servers based on the first and second stored values.

A system having a plurality of servers and a load balancer receiving a server request, the load balancer directing the server request based on a first stored value and an availability of each of the servers.

DETAILED DESCRIPTION

Figure 1:
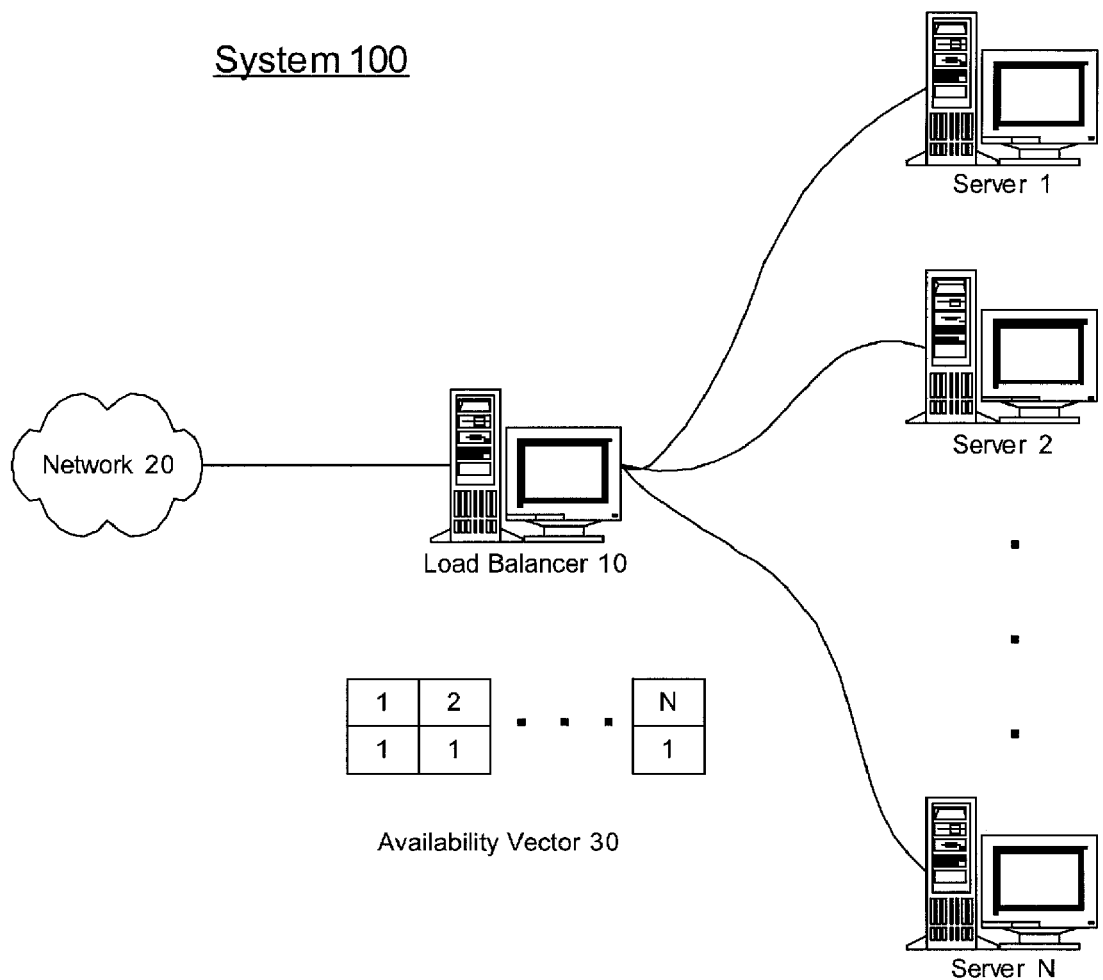
FIG. 1 shows an exemplary system according to the present invention.

The present invention may be further understood with reference to the following description and the appended drawings, wherein like elements are referred to with the same reference numerals. The exemplary embodiments of the present invention describe a system and method for balancing loads in server farms. The exemplary embodiments ensure that loading remains balanced among functioning servers within a server farm when one or more servers become nonfunctional. The exemplary system and method will be discussed in detail below.

It is noted that the term "server farm" is used throughout this description to refer to a group of servers which host and/or provide content on a network. A "server" may be, for example, a front-end web server that stores and displays web pages. Alternately, a server may be a secure web server that handles secured web traffic, such as a user's passwords or personal identification numbers. A server may also be a payment server for securely processing online payments using the user's credit card or bank account information. Additionally, a server may be an application server for storing and providing online applications. A server may also be a database server storing, for example, an online store's inventory and pricing information. Those of ordinary skill in the art will understand that these examples are intended to be illustrative rather than limiting, and that the term "server" may be applied to any other, similar system.

E-commerce can be implemented in numerous ways, from consumer-oriented online stores, malls, or auction sites, to business-to-business applications such as Electronic Data Interchange, to back-office functions like electronic payment systems and order management. E-commerce is defined as a process or event that results in the electronic transfer of value between two or more parties, with value represented by cash (or cash equivalents), goods, services, or promises made by buyers or sellers.

An e-commerce transaction may involve several steps, such as marketing, ordering, payment, and support for delivery. An electronic market allows participating buyers and sellers to exchange goods and services, supported by information technology. Electronic markets have three main functions: (1) matching buyers and sellers, (2) facilitating commercial transactions, and (3) providing legal infrastructure. Information technology permeates all three of these functions to help to increase market efficiency and reduce transaction costs. Electronic trade processes including searching, valuation, payment settlement, logistics and authentication support the interaction between electronic market participants.

Two important goals in designing an e-commerce system are availability and scalability. Low availability can result in lost revenue, reduced market share, and bad publicity. A system must therefore be sufficiently robust in order to maintain availability. Scalability is critical due to unpredictable customer behavior; infrastructure of an e-commerce system must be designed so that information services scale with demand. For a system to be adequately available and scalable, it must provide adequate service levels even when workload increases above expected levels.

In order to insure that these standards are met, participants in e-commerce of significant volume will often employ server farms incorporating multiple servers in order to improve efficiency, reliability, stability and availability. In such situations, traffic should be balanced among the multiple servers within a server farm in order to insure substantially even distribution.

In particular, it is important to maintain such an even distribution in situations when one or more servers within a server farm are unavailable. Unavailability may be, for example, due to an overload condition, a failed network connection, a power outage, etc. In such situations, the remaining available servers must each handle additional traffic, making even distribution especially important. If one or relatively few servers within a server farm receive all of the traffic that would normally be routed to the unavailable servers, this subsequent overloading can result in a domino effect and further server unavailability.

To insure a desirable distribution of traffic, a server farm may include a load balancer dedicated to monitoring and controlling distribution. The load manager may be, for example, a computer specifically dedicated to this task or a software application running on a computer that also handles other tasks.

FIG. 1 shows an exemplary system 100 according to the present invention. The exemplary system 100 may act in accordance with the exemplary method 200 shown in FIG. 2. The system 100 includes a plurality of N servers 1, 2 . . . N. N may be any prime number (e.g., 5, 7, 11, 13, 17, etc.). The exemplary system 100 also includes a load balancer 10 that coordinates the traffic sent to the servers 1, 2 . . . N. The load balancer 10 may be, for example, a hardware module such as a computer that is specifically dedicated to coordinating network traffic, or it may be a software module operating on a computer that also performs other tasks. The load balancer is connected to, and receives server requests from, a network 20 (e.g., the Internet, a corporate intranet, etc.). The load balancer stores, among other types of data, an availability vector 30, the use of which will be described below.

Figure 2:
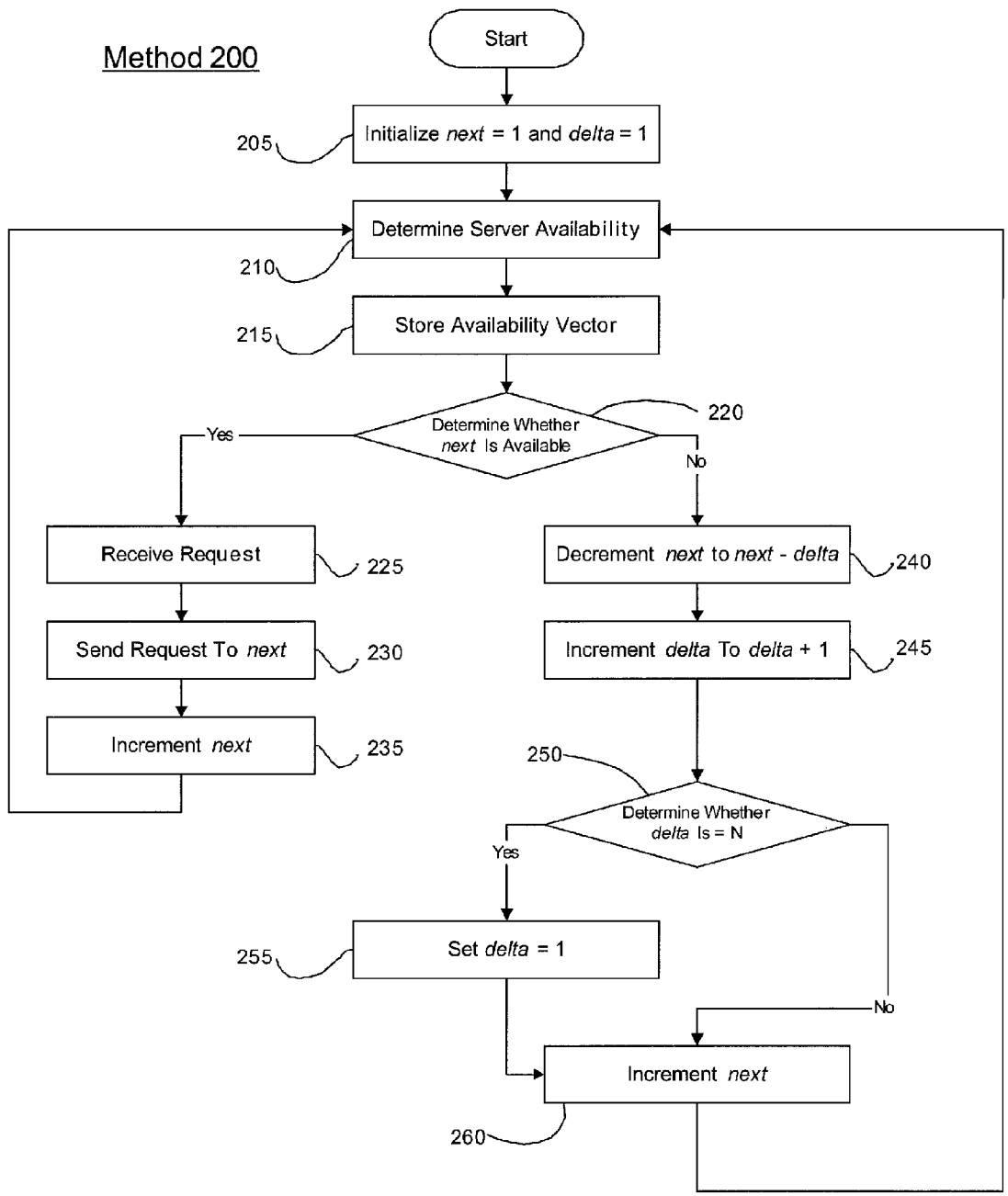
FIG. 2 shows an exemplary method for routing network traffic according to the present invention.
Figure 3:
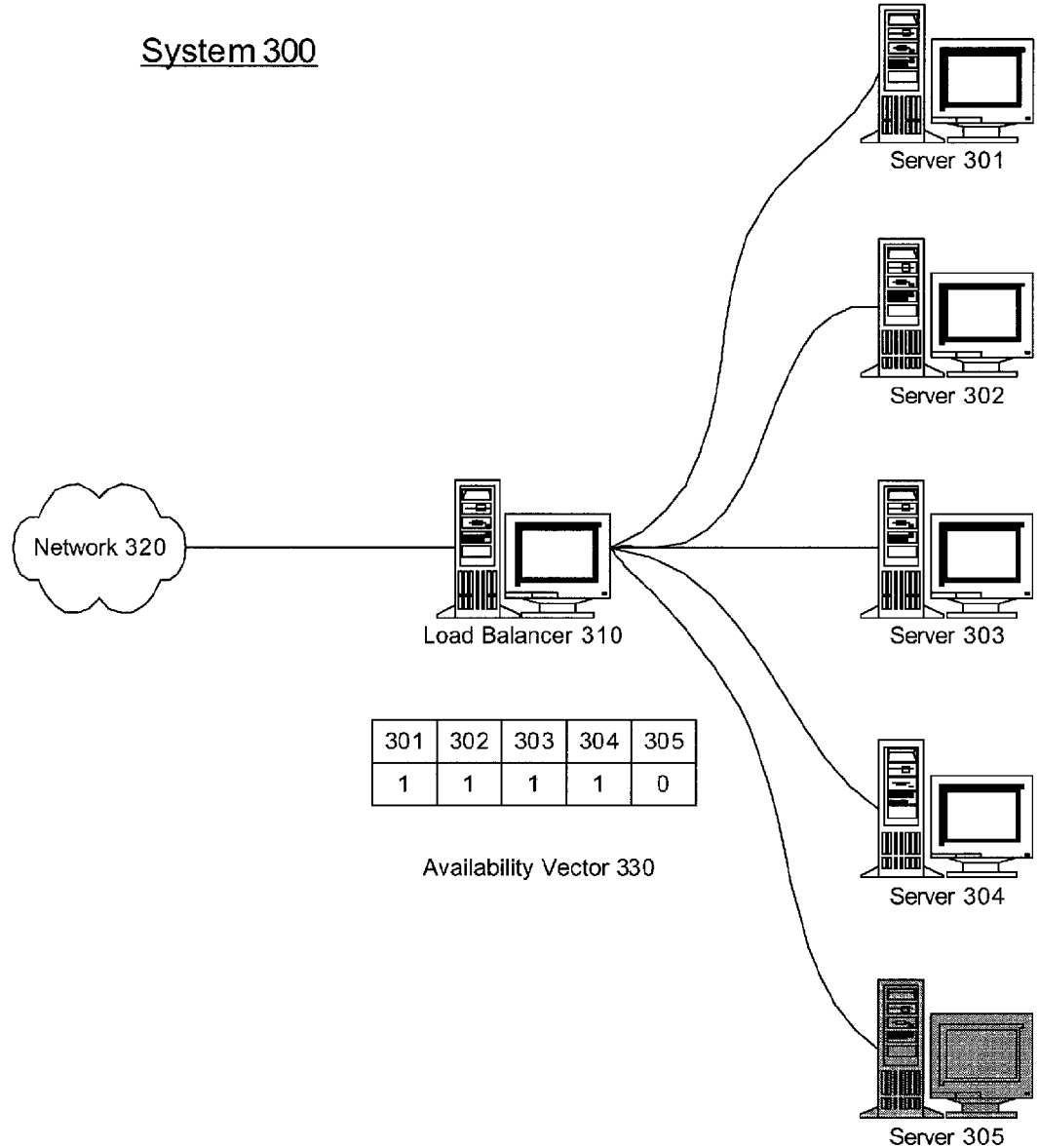
FIG. 3 shows an exemplary implementation of a system for routing network traffic according to the present invention.

FIG. 2 shows an exemplary method 200 according to the present invention. In an implementation wherein the exemplary method 200 is performed within the exemplary system 100, the load balancer 10 performs the steps of the exemplary method 200. In step 205, the values next and delta are both set to initial values of 1. The value next indicates which server among the plurality of servers from 1 to N will, if available, receive the next request that is sent to the load balancer 10. Depending on the function of the servers 1, 2 ... N, the request may be, for example, a user authentication request, a request to serve a webpage, a request to retrieve information (e.g., inventory information from an online store) from a database, a request to verify and charge a user's credit card, etc. The value delta is an incrementing value, the use of which will be described below.

In step 210, the availability of the servers present within the system 100 is determined. In step 215, the availability status of each of the servers is stored in an availability vector 30 of length N. Each server from 1 to N corresponds to a component within the availability vector 30 from 1 to N; in the exemplary method, each component of the availability vector 30 is set to a value of 1 if the corresponding server is available and to a value of 0 if the corresponding server is unavailable.

In step 220, it is determined whether the server corresponding to the next value is available. In the exemplary method, this determination may be made by consulting the component of the availability vector corresponding to the next value. If the appropriate server is available, then in step 225 a request is received, such as from the network 20. In step 230, the request received in step 225 is sent to the server corresponding to the next value. Subsequently, in step 235, the next value is incremented by the delta value. In other words, the delta value is added to the current next value to obtain the new next value; if the sum of the two values is greater than the number of servers N, counting resumes at the first server. This step can be described using the mathematical expression:

$$\text{next}_{new}=(\text{next}_{old}+\text{delta})\bmod N$$

After incrementing the next value in step 235, the method returns to step 210, where the availability of the servers 1 through N is reestablished.

Alternately, if, in step 220, it is determined that the server corresponding to the current next value is unavailable, the method proceeds to step 240. In step 240, the value next is decremented by performing the operation:

$$\text{next}_{new}=\text{next}_{old}-\text{delta}$$

In other words, the system returns from the next value of the server that has been determined to be unavailable, to the next value corresponding to the server that previously received a server query. Subsequently, in step 245, the value of delta is incremented:

$$\text{delta}_{new}=\text{delta}_{old}+1$$

In step 250, it is determined whether delta is equal to N. If this is true, then in step 255, delta is reset to its initial value of 1. The value of delta must be reset once it reaches N; otherwise, each time next is incremented in step 235, $\text{next}_{new}$ will be equal to $\text{next}_{old}$. After step 255, or if it is determined in step 250 that delta is not equal to N, the method continues at step 260, where next is incremented by the new value of delta. This is performed in the same way as described above for step 235. After incrementing next in step 260, the method returns to step 220.

FIGS. 3, 4A, 4B, 4C and 4D show an exemplary application of the method 200. The system 300 includes five servers (i.e., N=5). It will be assumed, for the purposes of this example, that servers 301, 302, 303 and 304 are available, that server 305 is unavailable, and that this set of assumptions remains constant through the example. In step 205, the load balancer 310 sets initial values of 1 for both next and delta. In step 210, the load balancer 310 determines the availability of each of servers 301, 302, 303, 304, 305. In step 215, the load balancer 310 stores the availability status of the servers in availability vector 330.

Figure 4A:
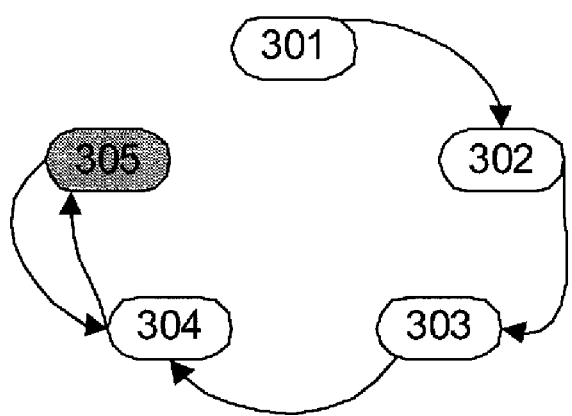
FIGS. 4A-4D show the routing of network traffic by applying the exemplary method of FIG. 2 to the implementation of FIG. 3.

In step 220, the load balancer 310 determines whether the server corresponding to the current next value is available, i.e., consults availability vector 330 and determines that server 301 is available. In step 225, the load balancer 310 waits for and receives a request from network 320. In step 230, the load balancer 310 sends the request to server 301. In step 235, the value of next is incremented by the value of delta. The method returns to step 220 and repeats the process, incrementing next to a value of three, and then four. Eventually, next is incremented to a value of five. FIG. 4A illustrates this initial process.

When the method returns to step 220 with a next value of five, the load balancer 310 determines that server 305 is unavailable, so the method continues at step 240. In step 240, next is decremented, i.e. delta is subtracted from next to return to its immediate previous value. In the present example, this means next returns to a value of four. In step 245, delta is incremented to two. In step 250, the load balancer 310 determines whether delta has been incremented to the point that it is equal to N (i.e., five). Because it has not, the method continues at step 260, where next is incremented by the new delta value. In this case:

$$\text{next}_{new}=(\text{next}_{old}+\text{delta})\bmod N=(4+2)\bmod 5=1$$

Figure 4B:
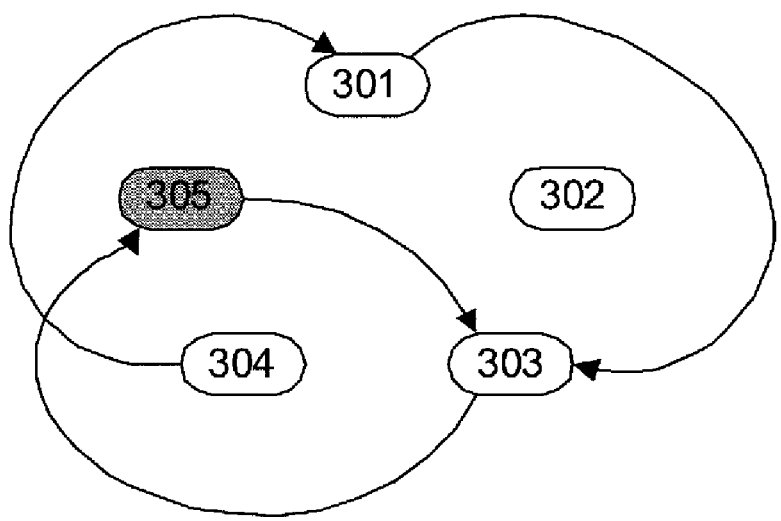

After both delta and next have been incremented, the method returns to step 210, where the availability status of all the servers 301, 302, 303, 304, 305 is reverified. The availability status is updated in step 220, and the availability of the server corresponding to the new value of next is determined in step 230. The method continues to iterate with a delta value of two, sending queries to server 301 and server 303. The method attempts to continue at server 305, but because server 305 is not available, returns to server 303 as described above in step 240. FIG. 4B shows this portion of the process.

Figure 4C:
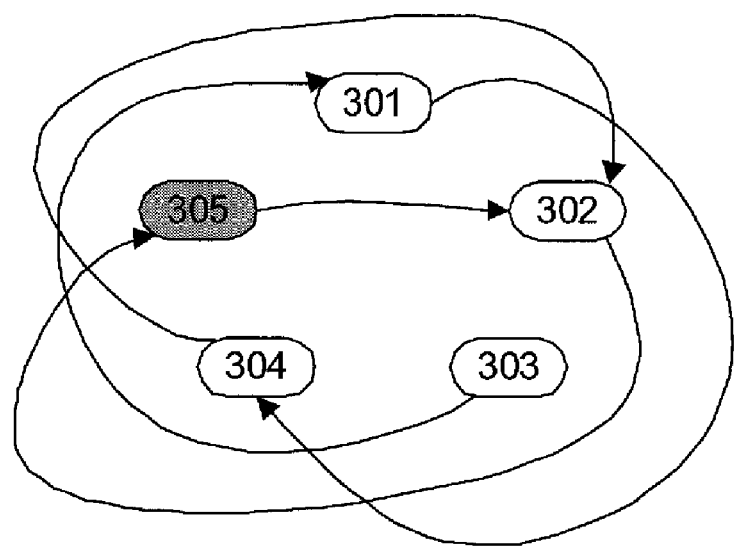

Delta is then incremented to a value of three, and the method continues, sending queries to server 301, server 304, and server 302. The method would continue at server 305, but, because server 305 is unavailable, returns to server 302. FIG. 4C shows this portion of the process.

Figure 4D:
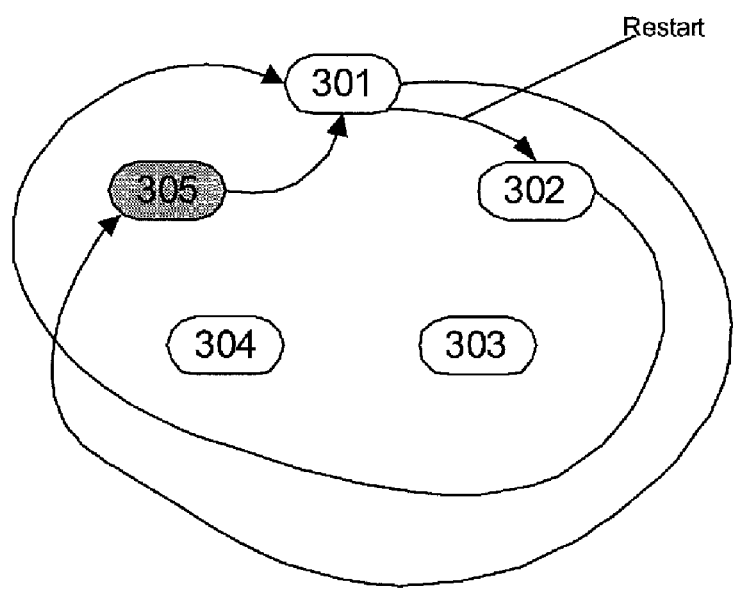

Delta is then incremented to a value of four, and the process continues at server 301. It attempts to continue at server 305, but because server 305 remains unavailable, returns to server 301. FIG. 4D shows this portion of the process.

Because further incrementing delta would cause it to equal five (i.e. be equal to N), the method proceeds through step 255 (rather than from step 250 directly to step 260) and delta is instead reset to its initial value of one. Repetition continues as described above with reference to FIG. 4A.

It should be noted that the specific exemplary application shown in FIGS. 4A-4D results in four queries routed to server 301 and two queries routed to each of servers 302, 303 and 304. While minor inequalities are present resulting from this method, they become less significant for larger values of N (i.e., systems incorporating more servers).

The exemplary embodiments of the present invention thus use a simple algorithm, based in number theory, to insure that server requests are evenly distributed among servers within a server farm. A more even distribution enables such a system to be better able to cope with workload above expected levels.

As a result, e-commerce systems will function more efficiently and effectively and improve the user experience.

It will be apparent to those skilled in the art that various modifications may be made in the present invention, without departing from the spirit or scope of the invention. Thus, it is intended that the present invention cover the modifications and variations of this invention provided they come within the scope of the appended claims and their equivalents.

What is claimed is:

1. A method, comprising:
receiving a server request;
scheduling one of a plurality of servers to receive a server request, wherein the scheduled one of the plurality of servers is selected based on a first stored value and a second stored value;
determining whether the scheduled one of the plurality of servers is available;
when the scheduled one of the servers is unavailable:
incrementing the second stored value by a predetermined amount
decrementinq the first stored value based on, $next_{new} = next_{old} - delta$ wherein, $next_{old}$ is the first stored value, delta is a second stored value, and $next_{new}$ is the first stored value after it is decremented;
directing the server request to another one of the plurality of servers based on the first and second stored values;
when the scheduled one of the servers is available:
directing the server request to the one of the servers
incrementing the first stored value after the server request is directed to the one of the servers, the incrementing based on, $next_{new} = (next_{old} + delta) \mod N$ wherein $next_{new}$ is the first stored value after it is incremented by delta, the second stored value and $next_{old}$ is the first stored value before it is incremented by delta and N is a number of servers.

2. The method of claim 1, further comprising:
storing an availability vector for each of the plurality of servers.

3. The method of claim 1, wherein a number of the plurality of servers is a prime number.

4. The method of claim 1, wherein the another one of the servers is determined based on incrementing the first stored value by the second stored value.

5. The method of claim 4, further comprising:
decrementing the first stored value by the second stored value prior to incrementing the first stored value by the incremented second stored value.

6. The method of claim 1, further comprising:
setting the first and second stored values to 1.

7. A system, comprising:
a plurality of computer servers; and
a load balancer receiving a server request, the load balancer directing the server request based on a first stored value and an availability of each of the servers,
if one of the servers corresponding to the first stored value is unavailable, the load balancer:
decrements the first stored value based on, $next_{new} = next_{old} - delta$ wherein, $next_{old}$ is the first stored value, delta is a second stored value,
and $next_{new}$ is the first stored value after it is decremented; and increments the second stored value by a predetermined value; and
if one of the server correspond to the first stored value is available, the load balancer:
directs the server request to one of the servers corresponding to the first stored value when the one of the servers is available; and
increments the first stored value after the server request is directed to the one of the servers, the incrementing based on, $next_{new} = (next_{old} + delta) \mod N$ wherein $next_{new}$ is the first stored value after it is incremented by delta, the second stored value and $next_{old}$ is the first stored value before it is incremented by delta and N is a number of servers.

8. The system of claim 7, wherein the first stored value is incremented by the incremented second stored value and the load balancer directs the server request to the server corresponding to the incremented first stored value.

9. The system of claim 7, wherein a number of servers is a prime number.

10. The system of claim 7, wherein if the second stored value equals a number of servers, the second stored value is reset to 1.

11. The system of claim 7, wherein the load balancer is implemented in one of the plurality of servers.

12. The system of claim 7, wherein the load balancer includes an availability vector storing the availability of each of the plurality of servers.

13. A non-transitory computer readable storage medium storing a set of instructions executable by a processor, the set of instructions operable to:
receive a server request;
schedule one of a plurality of servers to receive a server request, wherein the scheduled one of the plurality of servers is selected based on a first stored value and a second stored value;
determine whether the scheduled one of the plurality of servers is available;
when the scheduled one of the servers is unavailable:
incrementing the second stored value by a predetermined amount
decrementing the first stored value based on, $next_{new} = next_{old} - delta$ wherein, $next_{old}$ is the first stored value, delta is a second stored value, and $next_{new}$ is the first stored value after it is decremented;
directing the server request to another one of the plurality of servers based on the first and second stored values;
when the scheduled one of the servers is available:
directing the server request to the one of the servers
incrementing the first stored value after the server request is directed to the one of the servers, the incrementing based on, $next_{new} = (next_{old} + delta) \mod N$ wherein, $next_{new}$ is the first stored value after it is incremented by delta, the second stored value and $next_{old}$ is the first stored value before it is incremented by delta and N is a number of servers.

* * * * *